(12) United States Patent
Han et al.

(10) Patent No.: US 7,010,181 B2
(45) Date of Patent: Mar. 7, 2006

(54) DEVICE AND METHOD FOR COMPENSATING FOR POLARIZATION MODE DISPERSION IN OPTICAL TRANSMISSION

(75) Inventors: Ki-Ho Han, Busan (KR); Moo-Jung Chu, Daejeon (KR)

(73) Assignee: Electronics and Telecommunications Research Institute, (KR)

( * ) Notice: Subject to any disclaimer, the term of this patent is extended or adjusted under 35 U.S.C. 154(b) by 285 days.

(21) Appl. No.: 10/687,423

(22) Filed: Oct. 15, 2003

(65) Prior Publication Data

US 2004/0120629 A1    Jun. 24, 2004

(30) Foreign Application Priority Data

Dec. 24, 2002  (KR) ............... 10-2002-0083726

(51) Int. Cl.
*G02B 6/00* (2006.01)
(52) U.S. Cl. .................... 385/11; 398/147; 398/158
(58) Field of Classification Search ............... None
See application file for complete search history.

(56) References Cited

U.S. PATENT DOCUMENTS

| | | | |
|---|---|---|---|
| 5,659,412 A * | 8/1997 | Hakki | 398/152 |
| 5,859,939 A * | 1/1999 | Fee et al. | 385/24 |
| 5,930,414 A | 7/1999 | Fishman et al. | |
| 6,130,766 A | 10/2000 | Cao | |
| 6,236,495 B1 | 5/2001 | Moeller | |
| 6,604,871 B1 * | 8/2003 | Cao | 398/158 |

FOREIGN PATENT DOCUMENTS

JP    2002-183541    6/2001

OTHER PUBLICATIONS

B.W.Hakki, "Polarization Mode Dispersion Compensation by Phase Diversity Detection"; IEEE Photonics Tech. Ltrs., vol. 9, No. 1, Jan. 1997 (pp121-123).

* cited by examiner

*Primary Examiner*—Juliana Kang
(74) *Attorney, Agent, or Firm*—Blakely Sokoloff Taylor & Zafman

(57) ABSTRACT

A device for compensating for PMD occurring in a transmission optical fiber in an optical transmission system. An output beam from an optical fiber link changes its polarization state by a polarization controller (PC) to be applied to a PBS. A first polarization component passes through a variable delay line, rotates by a predetermined angle, and is inputted to the PBS. A portion of a second polarization component is transmitted by a predetermined mirror. The reflected second polarization component is applied to the PBS to be combined with the first polarization component inputted to the PBS. The transmitted second polarization component passes through a photo-detector and a BPF. The filtered signal is inputted to a PC controller to select the smaller value among the currently and previously measured power values.

15 Claims, 4 Drawing Sheets

DEVICE AND METHOD FOR COMPENSATING FOR POLARIZATION MODE DISPERSION IN OPTICAL TRANSMISSION

CROSS REFERENCE TO RELATED APPLICATION

This application is based on Korea Patent Application No. 2002-83726 filed on Dec. 24, 2002 in the Korean Intellectual Property Office, the content of which is incorporated herein by reference.

BACKGROUND OF THE INVENTION

1. Field of the Invention

The present invention generally relates to polarization mode dispersion compensation, and more particularly, to a device and a method for automatically compensating for polarization mode dispersion (referred to as PMD hereinafter) that optical signals are subjected to while being transmitted in a high-speed optical transmission system.

2. Description of the Related Art

In a high-speed optical transmission system, PMD occurring in a transmission optical fiber is one of the main factors limiting the bandwidth and transmission distance of optical signals. PMD occurs in an optical fiber as a result of a small residual birefringence that is introduced in the fiber core by asymmetric internal stress and strain due to external forces acting upon the fiber as well as random polarization coupling. PMD causes waveform distortion of an optical signal due to differential group delay or differential time delay occurring between two mutually orthogonal polarization states, which is called the "principal states of polarization" (referred to as PSP hereinafter) of a transmission optical fiber. Each of the two PSP components is transmitted without distortion of its waveform. When a differential time delay that substantially equals the differential time delay between two PSP components induced in optical fiber link, but of opposite sign, is artificially applied to the two PSP components, mutual delay is cancelled out to compensate for signal distortion due to PMD.

Prior arts in which the PMD compensation principle is practiced are explained below.

B. W. Hakki proposed a PMD compensation method that is described in an article entitled "Polarization Mode Dispersion Compensation by Phase Diversity Detection" in IEEE Photonics Technology Letters, Vol 9, pp. 121–123 (1997). This technique determines a differential time delay between two PSP components using mixers and applies a differential time delay that substantially equals the determined differential time delay to a variable delay line to compensate for PMD. In this case, however, the two electric signal powers inputted to the mixers must be identical to each other irrespective of a variation in the optical power intensity of the two PSP components. This requires a separate high-speed automatic gain control (AGC) circuit. Accordingly, expensive accurate high-speed electronics are additionally needed as the bit rate increases so that system construction costs are raised and the system structure becomes complicated.

Another prior art employing the PMD compensation principle is disclosed in U.S. Pat. No. 5,930,414, entitled "Method and Apparatus for Automatic Compensation of First-order Polarization Mode Dispersion". This technique uses a Mach-Zehnder interferometer type of compensator to integrate the electric spectrum of the photo-detected output of the compensator and monitors the integrated value using a single controller to alternately feedback-control an optical delay line and a polarization transformer so as to compensate for a differential time delay due to PMD.

However, this technique must control the polarization transformer for each delay value given by the optical delay line to change all polarization states to find the maximum value of spectrum integration values, so it takes a long time to perform compensation.

Another prior method is disclosed in U.S. Pat. No. 6,130,766 entitled "Polarization Mode Dispersion Compensation via an Automatic Tracking of a Principal State of Polarization." In this technique, compensation of PMD is carried out in such a manner that the beam of a transmitter is frequency-modulated, and one output side of a polarization beam splitter monitors second-order harmonics of the interference signal of two PSP components to control a polarization controller, such that the second-order harmonics are minimized to extract only one undistorted component among the two PSP components. However, this technique requires a separate device and operation for frequency modulation at the transmitter, and its structure for signal processing is relatively complicated because it employs a digital signal processing mode.

SUMMARY OF THE INVENTION

It is, therefore, an object of the present invention to provide a device and a method for compensating for polarization mode dispersion, which separates control of the principal states of polarization from differential time delay control in an optical transmission system so as to substantially reduce a time required for PMD compensation, and to simultaneously automatically adapt to PMD variations over time to compensate PMD at a high speed.

Another object of the present invention is to provide a device and a method for compensating for polarization mode dispersion for securing reliability and efficiency of PMD compensation.

To accomplish the objects of the present invention, a device is provided for compensating for PMD that occurs in a transmission optical fiber in an optical transmission system, comprising a polarization controller (PC) for converting the state and direction of polarization of a signal beam received through the transmission optical fiber; a polarization beam splitter for splitting the signal beam outputted from the PC into two mutually orthogonal polarization components, to transmit a first polarization component among the two components to a first path and send a second polarization component to a second path, and then combining the two polarization components with each other after they have been reflected from the ends of the first and second paths to transmit the combined beam to an output path; a variable delay line for applying a time delay to the first polarization component traveling over the first path; a Faraday rotation mirror for rotating a polarization component outputted from the variable delay line of the first path by a predetermined angle to reflect it; a PSP monitoring part for rotating a portion of the second polarization component traveling over the second path by a predetermined angle to reflect it, and for receiving the remaining portion thereof to output it as an electric signal; a PC controller for controlling the PC such that two orthogonal PSP components of the signal beam are aligned with two orthogonal axes of the polarization beam splitter using the signal outputted from the PSP monitoring part; an optical tap for branching the signal beam that is outputted from the polarization beam splitter to travel to the output path; and a delay line controller for controlling the variable delay line using the signal beam branched by the optical tap, to remove differential time delay between the first and second polarization components of the signal beam.

Here, the Faraday rotation mirror located on the first path includes a Faraday rotator and a mirror.

The PSP monitoring part may include a partial transmission Faraday rotation mirror that consists of a Faraday rotator and a partial transmission mirror, to rotate a portion of the second polarization component by a predetermined angle to reflect it and transmit the remaining portion thereof; a photo-detector for converting the beam transmitted through the partial transmission Faraday rotation mirror into an electric signal; and a band pass filter for filtering a specific frequency component of the electric signal.

The PSP monitoring part may include an optical tap; a Faraday rotation mirror for rotating the second polarization component that has passed through the optical tap by a predetermined angle to reflect it; a photo-detector for converting a beam branched out by the optical tap into an electric signal; and a band pass filter for filtering a specific frequency component of the electric signal.

The PC controller may comprise a power comparator for comparing a first power value of the signal outputted from the PSP monitoring part with a second power value that has been previously measured; and a feedback control signal applying part for applying a feedback control signal to the PC to select the smaller value among the first and second power values.

The delay line controller may comprise a photo-detector for converting the beam branched out by the optical tap into an electric signal; a band pass filter for filtering a specific power spectrum component of the electric signal; a power comparator for comparing a first power value of the signal filtered by the band pass filter with a second power value that has been previously measured; and a feedback control signal applying part for applying a feedback control signal to the variable delay line to select the larger value among the first and second power values.

Alternately, the delay line controller may comprise a DOP (Degree of Polarization) measurement unit for measuring DOP of the signal beam branched out by the optical tap; a DOP comparator for comparing the measured first DOP with a second DOP that has been previously measured; and a feedback control signal applying part for applying a feedback control signal to the variable delay line to select the larger value among the first DOP and the second DOP.

In the PMD compensating device having the above-described characteristics, it is preferable that the PC controller be operated independently of the delay line controller.

To accomplish the objects of the present invention, there is provided a method for compensating for PMD that occurs in a transmission optical fiber in an optical transmission system, comprising: a PC converting the state and direction of polarization of a signal beam received through the transmission optical fiber; a polarization beam splitter splitting the signal beam outputted from the PC into two mutually orthogonal polarization components, to transmit a first polarization component among the two components to a first path and transmit a second polarization component to a second path, and combining the two polarization components with each other after they have been reflected from the ends of the first and second paths to transmit the combined beam to an output path; variably applying a time delay to the first polarization component traveling over the first path using a variable delay line; rotating a polarization component outputted from the variable delay line of the first path by a predetermined angle to reflect it through a Faraday rotation mirror; a PSP monitoring part rotating a portion of the second polarization component traveling over the second path by a predetermined angle to reflect it and transmitting the remaining portion thereof; converting the beam transmitted through the PSP monitoring part into an electric signal and controlling the PC with a PC controller such that two orthogonal PSP components of the signal beam are aligned with two orthogonal axes of the polarization beam splitter using the electric signal; branching the signal beam that is outputted from the polarization beam splitter to travel to the output path using an optical tap; and removing differential time delay between the first and second polarization components of the signal beam using the signal beam branched by the optical tap.

(e) includes: rotating a portion of the second polarization component traveling over the second path by a predetermined angle to reflect it and transmitting the remaining portion thereof; converting the transmitted component into an electric signal; and filtering a specific frequency component of the power spectrum of the electric signal.

(e) includes: branching and passing the second polarization component traveling over the second path using an optical tap; rotating the polarization component that has passed through the optical tap by a predetermined angle to reflect it; converting the beam component branched by the optical tap into an electric signal; and filtering a specific frequency component of the power spectrum of the electric signal.

(f) comprises: comparing a first power value of the signal outputted from the PSP monitoring part with a second power value that has been previously measured; and applying a feedback control signal to the PC to select the smaller value among the first and second power values, to align the first and second polarization components of the signal beam with two orthogonal axes of the polarization beam splitter.

(h) comprises: converting the beam branched out by the optical tap into an electric signal; filtering a specific power spectrum component of the power spectrum of the electric signal; comparing a first power value of the filtered signal with a second power value that has been previously measured; and applying a feedback control signal to the variable delay line to select the larger value among the first and second power values, to remove differential time delay between the first and second polarization components.

(h) includes: measuring DOP of the signal beam outputted from the optical tap; comparing the measured first DOP with a second DOP that has been previously measured; and applying a feedback control signal to the variable delay line to select the larger value among the first DOP and the second DOP, to remove differential time delay between the first and second polarization components.

Preferably, (f) and (h) are carried out independently of each other.

BRIEF DESCRIPTION OF THE DRAWINGS

Further objects and advantages of the invention can be more fully understood from the following detailed description taken in conjunction with the accompanying drawings, in which.

DETAILED DESCRIPTION OF THE PREFERRED EMBODIMENT

The present invention will now be described in connection with preferred embodiments with reference to the accompanying drawings.

Figure 1:
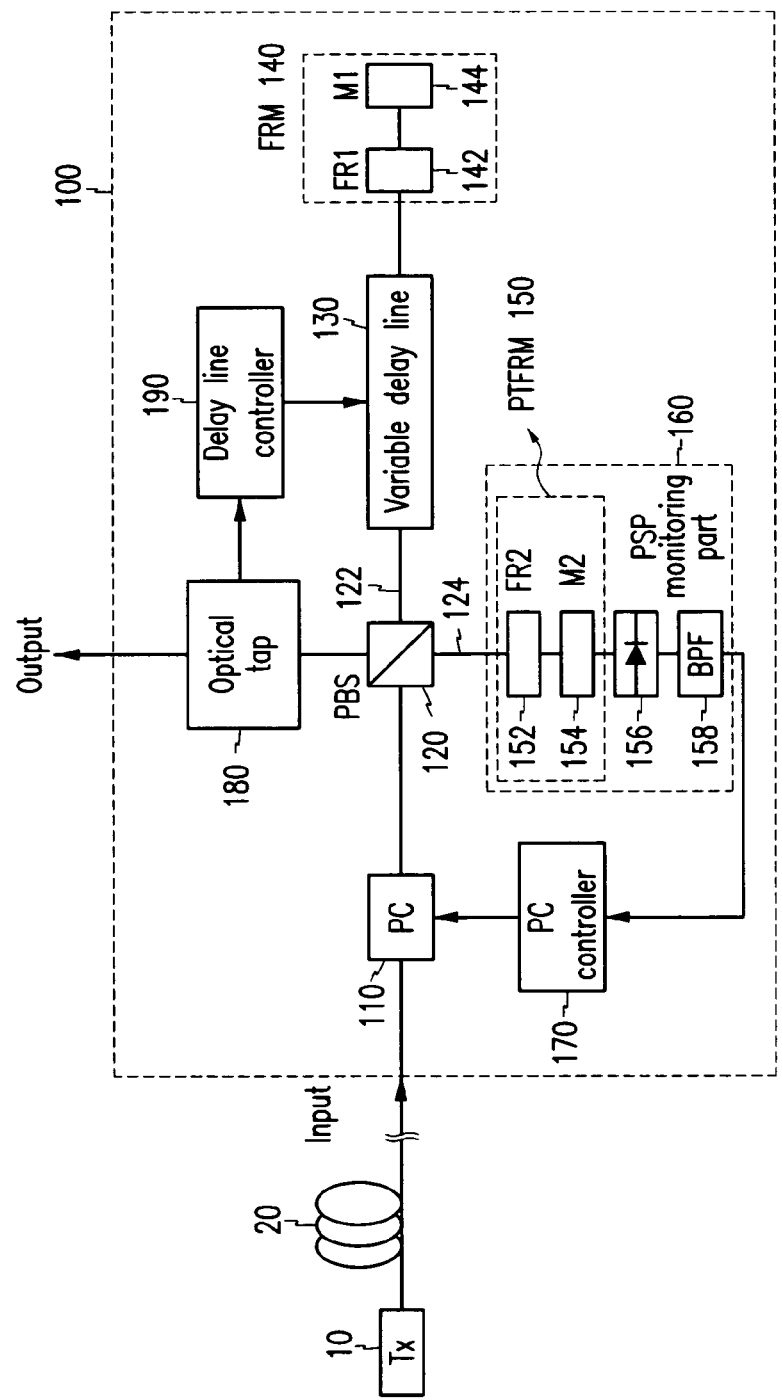
FIG. 1 roughly illustrates the configuration of a polarization mode dispersion compensator according to an embodiment of the present invention.

FIG. 1 roughly illustrates the configuration of a polarization mode dispersion compensator according to an embodiment of the present invention.

The PMD compensator according to an embodiment of the present invention includes a polarization controller (referred to as PC hereinafter) 110 for receiving an optical signal transmitted through a transmission optical fiber 20 coupled to a transmitter 10, a polarization beam splitter (referred to as PBS hereinafter) 120 connected to the output terminal of the PC 110, a variable delay line 130 located on a first path 122 of the PBS, a principal states of polarization (PSP) monitoring part 160 located on a second path 124 of the PBS, a PC controller 170 coupled to the output of the PSP monitoring part to control the PC, a Faraday rotation mirror 140 consisting of a Faraday rotator (FR1) 142 and a mirror (M1) 144 placed at the output side of the variable delay line 130, and an optical tap 180 located on an output path of the PBS 120.

The PSP monitoring part 160 includes a partial transmission Faraday rotation mirror (PTRM) 150 consisting of a Faraday rotator (FR2) 152 and a mirror (M2) that partially transmits a beam, a photo-detector 156 for detecting the beam transmitted through the PTRM 150 to output it as an electric signal, and a band pass filter (BPF) 158 for filtering the signal outputted from the photo-detector. The signal outputted from the band pass filter is applied to the PC controller 170.

Figure 2:
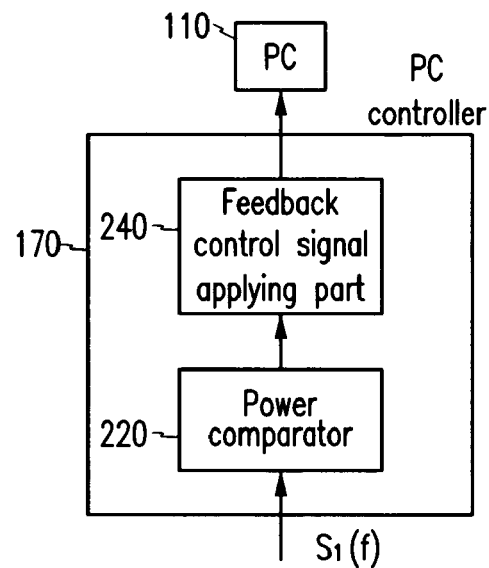
FIG. 2 illustrates the configuration of the PC controller of FIG. 1.

FIG. 2 illustrates the configuration of the PC controller 170 of the PMD compensator according to a preferred embodiment of the invention. The PC controller 170 includes a power comparator 220 for comparing the first measurement value of a signal filtered over some frequency range centered at a particular frequency by the band pass filter 158 of the PSP monitoring part 160 with the second measurement value corresponding to the previous measurement value, and a feedback control signal applying part 240 that applies a feedback control signal to the PC 110 to select the smaller value among the first and second measurement values.

The operation of the PMD compensator of the present invention constructed as above is described below.

As an optical signal transmitted from the transmitter 10 passes through the transmission optical fiber 20, a differential time delay occurs between two mutually orthogonal polarization components, that is, principal states of polarization, due to PMD. The optical signal having this differential time delay is applied to the PMD compensator 100, according to the present invention. The distorted optical signal inputted to the PMD compensator 100 changes its polarization state through the PC 110, and then enters the PBS 120 to be split into two mutually orthogonal polarized beams. One (the first polarized component) of the two mutually orthogonal beams outputted from the PBS 120 is sent to the variable delay line 130 on the first path 122, and the other one (the second polarized component) is delivered to the PSP monitoring unit 160 located on the second path 124.

The first polarized component that is sent to the variable delay line 130 is time-delayed while traveling over the variable delay line 130. The beam that is subjected to the time delay is rotated by an angle of 90 degrees by the FRM 140 to be reflected, and then time-delayed through the variable delay line 130 to be transmitted through the PBS 120 to the optical tap 180 on the output path.

The second polarized component inputted to the PSP monitoring unit 160 is partially rotated by an angle of 90 degrees and is reflected by the PTFRM 150, consisting of the FR2 152 and a partial transmission mirror 154, and the remaining portion of the second polarized component transmits through the PTFRM 150. The beam component reflected by the PTFRM 150 is transmitted through the PBS 120 to the optical tap 180, whereas the beam component that has passed through the PTFRM 150 is converted into an electric signal according to the photo-detector 156 and filtered by the band pass filter 158 to be applied to the PC controller 170.

The power comparator 220 compares the electric signal inputted to the PC controller 170, that is, the first measurement value, with the second measurement value that has been previously measured at a specific frequency. The feedback control signal applying part 240 applies the feedback control signal to the PC 110 to select the smaller value among the first and second measurement values. Specifically, the power value measured by the PC controller 170 varies depending on the control of the PC 110. The PC 110 is supplied with voltage (feedback control signal) such that the power value is minimized, that is, it converges on a minimum value.

Through the aforementioned feedback process, the two PSP components of the optical signal are aligned with two axes of the PBS 120 and separated from each other to travel over the first and second paths 122 and 124, respectively.

In the meantime, the impaired signals of the combined first and second polarized components are inputted to the delay line controller 190. The delay line controller 190 applies a feedback signal to the variable delay line 130 to control it repeatedly such that the differential time delay between the two polarized components is eliminated. As a result, a PMD-compensated signal can be obtained from the output of the PMD compensator 100.

As described above, the present invention can control PSP independently of differential time delay control so as to substantially reduce a time required for compensation and to automatically adapt to PMD that varies over time to compensate PMD at a high speed.

Figure 3:
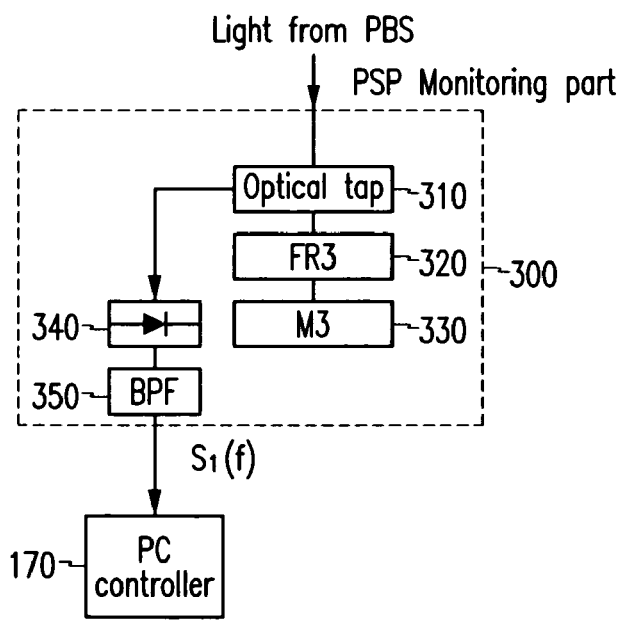
FIG. 3 illustrates the configuration of a PSP monitoring unit according to an embodiment of the present invention.

The PSP monitoring part 160 of the PMD compensator of the present invention may also have a configuration different from the one described above. FIG. 3 illustrates the configuration of the PSP monitoring unit according to an embodiment of the present invention.

As shown in FIG. 3, the PSP monitoring part 300 includes an optical tap 310, a Faraday rotator (FR3) 320, a total reflection mirror (M3) 330, a photo-detector 340, and a band pass filter 350. In this configuration, the optical tap 310 replaces the partial transmission mirror (M2) 154 to derive the component used for PSP monitoring from the beam sent from the PBS, and the remaining polarized component of the beam is reflected at an angle of 90 degrees and total-reflected according to the total reflection mirror (M3) 330 of the FR3 320. In the meantime, the two beam components that have been reflected by the mirrors 144 and 154 to be sent to the optical tap 180 are superposed on each other and branched out by the optical tap 180. A portion of the branched beam is inputted to the delay line controller 190 and the remaining portion thereof is outputted from the compensator 100 as a final output signal.

Figure 4:
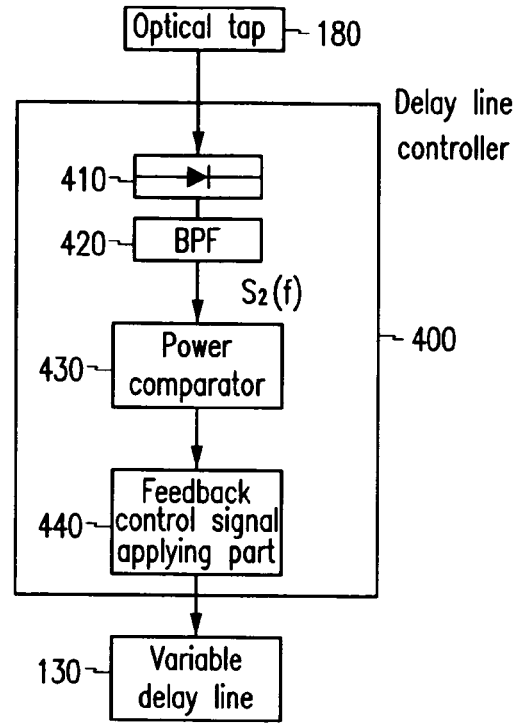
FIG. 4 illustrates the configuration of a delay line controller according to an embodiment of the present invention.

Meanwhile, the delay line controller of the PMD compensator according to the present invention may have the configuration shown in FIG. 4. Referring to FIG. 4, a delay line controller 400 according to a preferred embodiment of the invention includes a photo-detector 410, a band pass filter 420, a power comparator 430, and a feedback control signal applying part 440. In this configuration, a beam inputted to the delay line controller 400 is converted into an electric signal by the photo-detector 410 and a specific frequency component of the electric signal is filtered by the band pass filter 420. The power comparator 430 compares the electric signal with a value that has been previously measured, and the feedback control signal applying part 440 applies a feedback control signal to the variable delay line 130 to select the larger value among the two values that are compared with each other.

Figure 5:
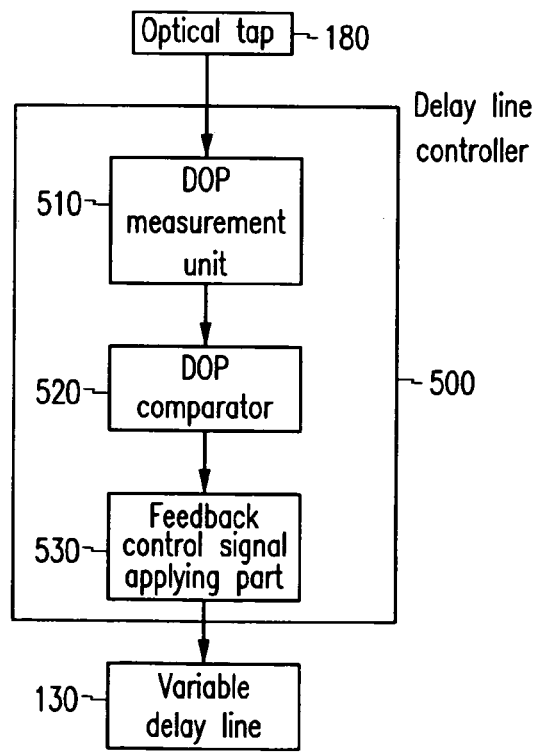
FIG. 5 illustrates the configuration of a delay line controller according to another embodiment of the present invention.

Furthermore, the delay line controller of the present invention may have another configuration as shown in FIG. 5. Referring to FIG. 5, the delay line controller 500 includes a DOP (Degree of Polarization) measurement unit 510, a DOP comparator 520, and a feedback control signal applying unit 530. In this case, the DOP measurement unit 510 measures DOP of a beam inputted to the delay line controller 500, and the DOP comparator 520 compares the currently measured DOP with a previously measured DOP. The feedback control signal applying unit 530 applies a feedback control signal to the variable delay line 130 to select the larger value among the compared values.

As described above, PC control is carried out through the aforementioned repeated feedback control procedure, independently of delay line control, to obtain a compensated signal.

The principle of PMD compensation through the feedback procedures according to the present invention is explained below in more detail.

As described above, a fast axis and a slow axis, that is, two orthogonal PSP axes, exist in the transmission optical fiber 20. These two PSP axes are represented as PSP+ and PSP−. Let it be assumed that a monochromatic light beam passes through an external modulator to be inputted into the optical fiber 20. The input beam is subjected to differential group delay, $\tau_f$, between two mutually orthogonal PSP components while passing through the optical fiber 20 and being transmitted through the PC 110. Then the beam passes through the FR2 152 and M2 154 located on the second path, to be applied to the photo-detector 156 that converts the beam into an electric signal. The power spectrum of the signal photoelectric-converted by the photo-detector 156 is represented by the following expression.

$$S_1(\omega)=(1-R)^2\alpha_0^2I_0^2\{(a^4+b^4+2a^2b^2\cos\omega\tau_f)|F(\omega)|^2+4a^2b^2|H(\omega)|^2\cos^2\omega_0\tau_f-4ab\cos\omega_0\tau_f Re[(a^2\exp(i\omega\tau_f)+b^2)F(\omega)H^*(\omega)]\}$$ [Expression 1]

where $F(\omega)$ and $H(\omega)$ are Fourier transforms of $\cos^2(\Delta\phi(t)/2)$ and $\cos(\Delta\phi(t+\tau)/2)\cos(\Delta\phi(t)/2)$, respectively, and $\alpha=\cos\theta_0$ cos θ and $b=\sin\theta_0\sin\theta$. In addition, $\Delta\phi(t)$ is a phase difference between two waveguides of the external modulator, $\omega_0$ is a light angular frequency, $\alpha_0$ is transmission loss of the optical fiber, and R is reflectivity of the mirror M2. $\theta_0$ is the angle between the polarization of the beam inputted into the optical fiber and the fast axis (PSP+) of the optical fiber, θ is the angle between the PSP+ component of the beam and one polarization axis (x-axis) of the polarization beam splitter, $I_0$ is the intensity of the beam from a light source, and $\omega=2\pi f$.

It is assumed that insertion loss of each of the constituent elements of the PMD compensator is ignored. To make the intensities of the two signal beams reflected on the first and second paths 122 and 124 identical to each other, it is required that the beam reflected on the first path 122 is subjected to the same amount of loss as the amount of loss of the beam reflected on the second path 124, corresponding to transmittance 1-R according to the mirror (M2) 154. For this, a method of using substantial insertion loss of the variable delay line 130 and a method of placing a variable attenuator on the first or second path 122 or 124 and adjusting it can be employed. In general, $F(\omega)$ is a sinc function and has the value 0 at the frequency $f=n/T(n=1,2, 3, \ldots)$ for a PRBS (Pseudo random bit sequence) NRZ rectangular data pulse signal whose bit time is T.

Figure 6:
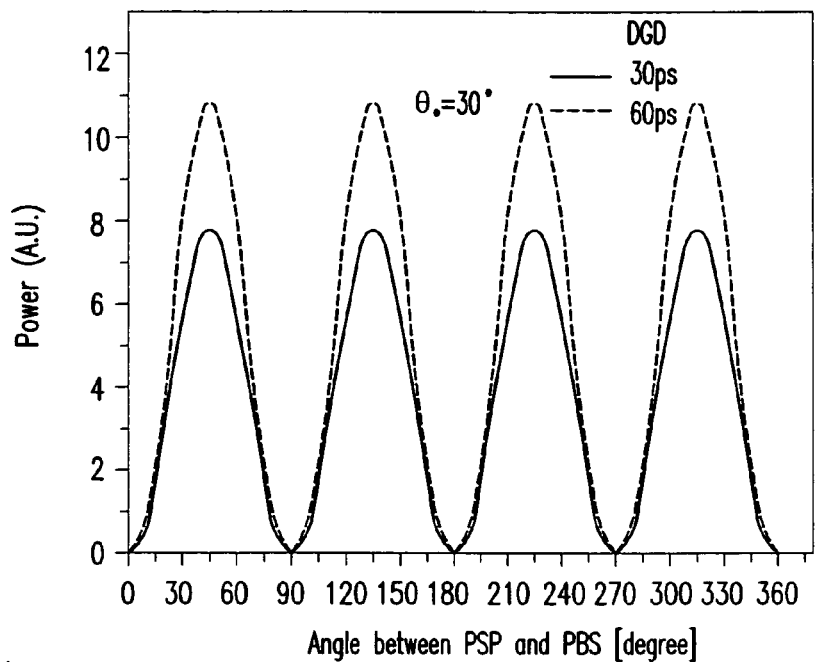
FIG. 6 is a graph showing the relationship between power and the angle between the axes of PSP and the axis of a PBS at 10 GHZ for each of given DGD values.

FIG. 6 is a graph showing a variation in $S_1(\omega)$ at 10 GHz. As shown in FIG. 6, $S_1(\omega)$ converges on the minimum value when $\theta=n\pi/2(n=0,1,2,\ldots)$. This means that two PSP components are respectively aligned with two mutually orthogonal axes of the PBS to be separated from each other. To obtain this result, a feedback procedure that compares the current measurement value and previous measurement value of $S_1(\omega)$ with each other and applies feedback voltage to the PC to select the smaller value among the compared values is needed. When this feedback procedure is repeatedly performed for PSP tracking, the angle θ converges to $n\pi/2$ ($n=0,1,2,\ldots$) and accordingly, the two PSP components are separated from each other by the PBS 120 to allow them to travel over different paths.

Figure 7:
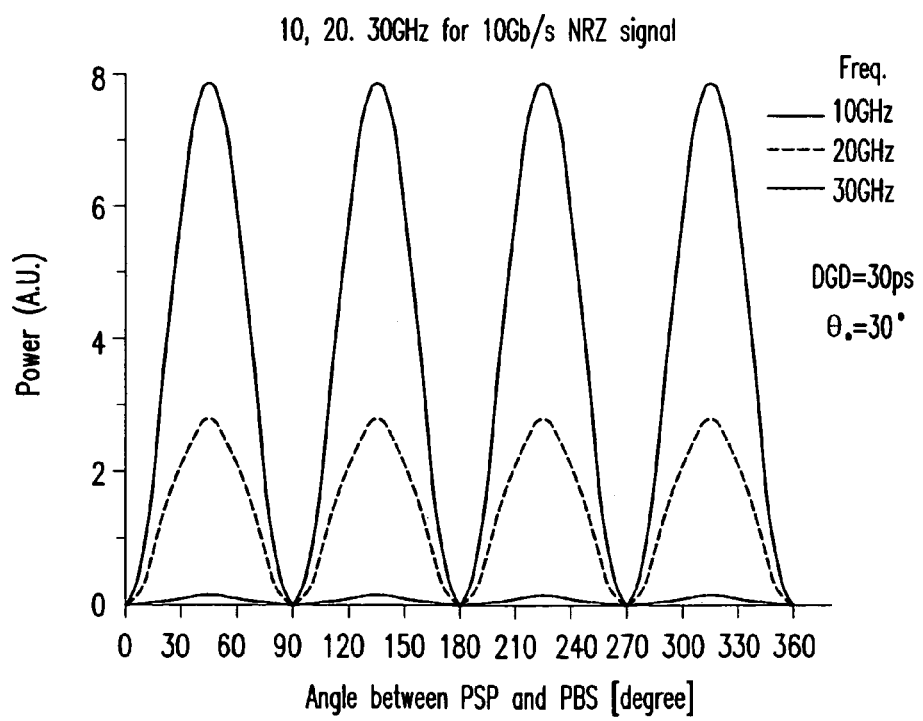
FIG. 7 is a graph showing the relationship between power and the angle between the axis of PSP and the axis of the PBS at 10, 20 and 30 GHz.

FIG. 7 is a graph showing the relationship between $S_1(\omega)$ and θ at 10 GHz, 20 GHz, and 30 GHz. FIG. 7 shows that PSP tracking for separation of PSP can be carried out even at 20 GHz and 30 GHz.

In case of an RZ rectangular data pulse signal having a ratio of pulse width to bit time of 0.5, a pilot frequency at which PSP tracking is possible is $f=2 n/T(n=1,2,3\ldots)$. According to this real-time PSP tracking method, two mutually orthogonal PSP components are separated from each other all the time even when PMD varies over time.

The two PSP components that are separated from each other travel and reflect over the first and second paths 122 and 124, respectively, and are combined with each other through the PBS 120, and then the combined beam enters the delay line controller 190 via the optical tap 180.

In the case where the delay line controller has the configuration of FIG. 4, the beam inputted from the optical tap 180 into the photo-detector 410 is converted into an electric signal to obtain the power spectrum as described below. For a PRBS NRZ pulse signal, the power spectrum can be represented by the following Expression 2.

$$S_2(\omega)=k_0^2R^2\alpha_0^2I_0^2[1-\sin^2 2\theta_0\sin^2(\omega\tau/2)]\cdot|F(\omega)|^2$$ [Expression 2]

where τ, which is the sum of differential group delay $\tau_f$ generated in the transmission optical fiber and differential group delay $\tau_c$ generated by the compensator, represents the total amount of differential group delays. ω equals $2\pi f$ and $k_0$ denotes the coupling ratio of the optical tap. To acquire the compensated signal, the total amount of PMD, τ, must be zero. At this time, $S_2(\omega)$ indicates the maximum value at a specific frequency. Specifically, the feedback procedure of comparing the current measurement value and the previous measurement value of $S_2(\omega)$ with each other at a specific frequency and applying feedback voltage to the variable delay line to select the larger value among the compared values is repeated to finally obtain the maximum value of $S_2(\omega)$. As a result, τ becomes zero so that the compensated signal is acquired. It is noted that $S_2(\omega)$ exhibits the maximum value even when τ=n/f(n=1,2,3 . . . ) as in the case when τ=0. That is, $S_2(\omega)$ has the maximum value even at 200 ps of τ in the case where the pilot frequency is 5 GHz in Expression 2, so that $S_2(\omega)$ can converge on this maximum value through the tracking procedure.

To prevent this ambiguous signal, the range of the total amount of differential group delay is limited to less than 100 ps when the monitoring frequency is 5 GHz. The range of the total amount of differential group delay varies with the pilot frequency. As the pilot frequency decreases, a controllable range of τ increases.

Where the delay line controller has the configuration of FIG. 5, the DOP comparator 520 measures DOP of the input beam to compare it with the previous measurement value, and instructs the feedback control signal applying unit 530 to apply feedback voltage to the variable delay line 130 to select the larger value among the compared values. In case of a PRBS NRZ signal, DOP increases as τ decreases toward zero. Accordingly, τ becomes zero when DOP is at a maximum so that the compensated signal is finally obtained.

Meanwhile, in the PMD compensator 100 shown in FIG. 1, the two FRMs 140 and 150 located at the ends of the first and second paths 122 and 124, respectively, rotate and reflect polarization components. The polarized beam inputted to the output path of PBS 120 and the polarization of the beam that is obtained in a manner such that the input beam travels along one of the first and second paths to be reflected by the rotary mirror and then travels that path again to pass through the PBS, are always orthogonal to each other. This principle can be proven using Jones matrix representation, as follows.

Where an arbitrary medium located on the optical path is a unitary matrix and a 90-degree rotation matrix is R, Jones matrix is represented by the following Expression 3.

$$M = \begin{bmatrix} a & b \\ -b^* & a^* \end{bmatrix}, R = \begin{bmatrix} 0 & -1 \\ 1 & 0 \end{bmatrix} \quad \text{[Expression 3]}$$

The total birefringence that the input polarized beam undergoes while it passes through the medium M to be rotated and reflected by the FRM and then passes through the medium again is represented by $M^T R M$. The calculation result of $M^T R M$ equals R. In other words, the reflected polarized beam is always perpendicular to the input polarized beam. Accordingly, the reflected polarized beam always travels through the PBS 120 of FIG. 1 toward the output path on which the optical tap is located. A single mode fiber with a birefringence in addition to air and a polarization maintaining fiber can be used as the medium of the first and second optical paths so as to secure stability and reliability of the compensation device.

Although specific embodiments including the preferred embodiment have been illustrated and described, it will be obvious to those skilled in the art that various modifications may be made without departing from the spirit and scope of the present invention, which is intended to be limited solely by the appended claims.

According to the present invention, PSP control is carried out independently of differential time delay control to substantially reduce a time required for PMD compensation and to automatically adapt to PMD variations over time to compensate PMD at a high speed.

Furthermore, the partial transmission Faraday rotation mirror is used as a constituent element of the compensation device to decrease loss. Moreover, not only air and polarization maintaining fiber but also the single mode optical fiber can be used as the medium of the optical paths, so that stability and reliability of the compensation device can be secured.

What is claimed is:

1. A device for compensating for PMD (polarization mode dispersion) that occurs in a transmission optical fiber in an optical transmission system, comprising:
   a polarization controller (PC) for converting the state and direction of polarization of a signal beam received through the transmission optical fiber;
   a polarization beam splitter for splitting the signal beam outputted from the PC into two mutually orthogonal polarization components, to transmit a first polarization component among the two components to a first path and send a second polarization component to a second path, and then combining the two polarization components with each other after they have been reflected from the ends of the first and second paths to transmit the combined beam to an output path;
   a variable delay line for variably applying a time delay to the first polarization component traveling over the first path;
   a Faraday rotation mirror for rotating a polarization component outputted from the variable delay line of the first path by a predetermined angle to reflect it;
   a PSP monitoring part for rotating a portion of the second polarization component traveling over the second path by a predetermined angle to reflect it and receiving the remaining portion thereof to output it as an electric signal;
   a PC controller for controlling the PC such that two orthogonal PSP components of the signal beam are aligned with two orthogonal axes of the polarization beam splitter using the signal outputted from the PSP monitoring part;
   an optical tap for branching the signal beam that is outputted from the polarization beam splitter to travel to the output path; and
   a delay line controller for controlling the variable delay line using the signal beam branched by the optical tap, to remove differential time delay between the first and second polarization components of the signal beam.

2. The device as claimed in claim 1, wherein the Faraday rotation mirror located on the first path includes a Faraday rotator and a mirror.

3. The device as claimed in claim 1, wherein the PSP monitoring part comprises:
   a partial transmission Faraday rotation mirror that includes a Faraday rotator and a partial transmission mirror, to rotate a portion of the second polarization component by a predetermined angle to reflect it and transmit the remaining portion thereof;
   a photo-detector for converting the beam transmitted through the partial transmission Faraday rotation mirror into an electric signal; and a band pass filter for filtering a specific frequency component of the electric signal.

4. The device as claimed in claim 1, wherein the PSP monitoring part comprises:
   an optical tap;
   a Faraday rotation mirror for rotating the second polarization component that has passed through the optical tap by a predetermined angle to reflect it;
   a photo-detector for converting a beam branched out by the optical tap into an electric signal; and
   a band pass filter for filtering a specific frequency component of the electric signal.

5. The device as claimed in claim 1, wherein the PC controller comprises:
   a power comparator for comparing a first power value of the signal outputted from the PSP monitoring part with a second power value that has been previously measured; and
   a feedback control signal applying part for applying a feedback control signal to the PC to select the smaller value among the first and second power values according to comparison results by the power comparator.

6. The device as claimed in claim 1, wherein the delay line controller comprises:
   a photo-detector for converting the beam branched out by the optical tap into an electric signal;
   a band pass filter for filtering a specific power spectrum component of the electric signal;
   a power comparator for comparing a first power value of the signal filtered by the band pass filter with a second power value that has been previously measured; and
   a feedback control signal applying part for applying a feedback control signal to the variable delay line to select the larger value among the first and second power values.

7. The device as claimed in claim 1, wherein the delay line controller comprises:
   a DOP (Degree of Polarization) measurement unit for measuring DOP of the signal beam branched out by the optical tap;
   a DOP comparator for comparing the measured first DOP with a second DOP that has been previously measured; and
   a feedback control signal applying part for applying a feedback control signal to the variable delay line to select the larger value among the first DOP and the second DOP.

8. The device as claimed in claim 1, wherein the PC controller is operated independently of the delay line controller.

9. A method for compensating for PMD that occurs in a transmission optical fiber in an optical transmission system, comprising:
   (a) a PC converting the state and direction of polarization of a signal beam received through the transmission optical fiber;
   (b) a polarization beam splitter splitting the signal beam outputted from the PC into two mutually orthogonal polarization components, to transmit a first polarization component among the two components to a first path and transmit a second polarization component to a second path, and combining the two polarization components with each other after they have been reflected from the ends of the first and second paths to transmit the combined beam to an output path;
   (c) variably applying a time delay to the first polarization component traveling over the first path using a variable delay line;
   (d) rotating a polarization component outputted from the variable delay line of the first path by a predetermined angle to reflect it through a Faraday rotation mirror;
   (e) a PSP monitoring part rotating a portion of the second polarization component traveling over the second path by a predetermined angle to reflect it and transmitting the remaining portion thereof;
   (f) converting the beam transmitted through the PSP monitoring part into an electric signal and controlling the PC with a PC controller such that two orthogonal PSP components of the signal beam are aligned with two orthogonal axes of the polarization beam splitter using the electric signal;
   (g) branching the signal beam that is outputted from the polarization beam splitter to travel to the output path using an optical tap; and
   (h) removing differential time delay between the first and second polarization components of the signal beam using the signal beam branched by the optical tap.

10. The method as claimed in claim 9, wherein (e) comprises:
    rotating a portion of the second polarization component traveling over the second path by a predetermined angle to reflect it and transmitting the remaining portion thereof;
    converting the transmitted component into an electric signal; and
    filtering a specific frequency component of the power spectrum of the electric signal.

11. The method as claimed in claim 9, wherein (e) comprises:
    branching and passing the second polarization component traveling over the second path using an optical tap;
    rotating the polarization component that has passed through the optical tap by a predetermined angle to reflect it;
    converting the beam component branched by the optical tap into an electric signal; and
    filtering a specific frequency component of the power spectrum of the electric signal.

12. The method as claimed in claim 9, wherein (f) comprises:
    comparing a first power value of the signal outputted from the PSP monitoring part with a second power value that has been previously measured; and
    applying a feedback control signal to the PC to select the smaller value among the first and second power values, to align the first and second polarization components of the signal beam with two orthogonal axes of the polarization beam splitter.

13. The method as claimed in claim 9, wherein (h) comprises:
    converting the beam branched out by the optical tap into an electric signal;
    filtering a specific power spectrum component of the power spectrum of the electric signal;
    comparing a first power value of the filtered signal with a second power value that has been previously measured; and
    applying a feedback control signal to the variable delay line to select the larger value among the first and second power values, to remove differential time delay between the first and second polarization components.

14. The method as claimed in claim 9, wherein (h) comprises:
  measuring DOP of the signal beam outputted from the optical tap;
  comparing the measured first DOP with a second DOP that has been previously measured; and
  applying a feedback control signal to the variable delay line to select the larger value among the first DOP and the second DOP, to remove differential time delay between the first and second polarization components.

15. The method as claimed in claim 9, wherein (f) and (h) are carried out independently of each other.

* * * * *